United States Patent
Tatemura (10) Patent No.: US 10,677,970 B2
(45) Date of Patent: Jun. 9, 2020

(54) OPTICAL FILTER AND NEAR-INFRARED CUT FILTER

(71) Applicant: AGC Inc., Chiyoda-ku (JP)

(72) Inventor: Mitsuyuki Tatemura, Haibara-gun (JP)

(73) Assignee: AGC Inc., Chiyoda-ku (JP)

( * ) Notice: Subject to any disclaimer, the term of this patent is extended or adjusted under 35 U.S.C. 154(b) by 164 days.

(21) Appl. No.: 15/868,206

(22) Filed: Jan. 11, 2018

(65) Prior Publication Data

US 2018/0136380 A1    May 17, 2018

Related U.S. Application Data (63) Continuation of application No. PCT/JP2016/072290, filed on Jul. 29, 2016.

(30) Foreign Application Priority Data

Jul. 31, 2015   (JP) .................. 2015-152252

(51) Int. Cl.
*F21V 9/04* (2018.01)
*F21V 9/06* (2018.01)
(Continued)

(52) U.S. Cl.
CPC ............... *G02B 5/208* (2013.01); *B32B 7/02* (2013.01); *B32B 17/06* (2013.01); *B32B 27/06* (2013.01);
(Continued)

(58) Field of Classification Search
CPC .... G02B 5/20; G02B 5/22; G02B 5/206–208; G02B 5/223–226; G02B 5/281;
(Continued)

(56) References Cited

U.S. PATENT DOCUMENTS

| | | | |
|---|---|---|---|
| 2004/0082460 A1 | 4/2004 | Yamane et al. | |
| 2015/0253477 A1* | 9/2015 | Nakao | H01L 27/14618 348/294 |
| 2016/0011348 A1 | 1/2016 | Hirakoso et al. | |

FOREIGN PATENT DOCUMENTS

| | | |
|---|---|---|
| CN | 104412136 A | 3/2015 |
| JP | 2-213803 | 8/1990 |

(Continued)

OTHER PUBLICATIONS

International Search Report dated Oct. 25, 2016 in PCT/JP2016/072290, filed on Jul. 29, 2016 (with English Translation).

(Continued)

*Primary Examiner* — Mustak Choudhury
(74) *Attorney, Agent, or Firm* — Oblon, McClelland, Maier & Neustadt, L.L.P.

(57) ABSTRACT

An optical filter has a substrate, a refractive index adjusting layer on the substrate, a characteristic improving layer having a stress adjustment function on the refractive index adjusting layer, and an optical multilayer film on the characteristic improving layer, wherein the refractive index adjusting layer is constituted by one to three layers, and the characteristic improving layer is a single-layer film whose physical film thickness is 600 nm or more. The optical filter whose substrate has small warpage and which has a good spectral characteristic is provided.

14 Claims, 5 Drawing Sheets

(51) Int. Cl.
| | |
|---|---|
| *G02B 5/08* | (2006.01) |
| *G02B 5/20* | (2006.01) |
| *B32B 7/02* | (2019.01) |
| *G02B 1/115* | (2015.01) |
| *G02B 5/28* | (2006.01) |
| *G02B 1/14* | (2015.01) |
| *B32B 17/06* | (2006.01) |
| *B32B 27/06* | (2006.01) |
| *G02B 1/11* | (2015.01) |

(52) U.S. Cl.
  CPC ............... *G02B 1/11* (2013.01); *G02B 1/115* (2013.01); *G02B 1/14* (2015.01); *G02B 5/281* (2013.01); *G02B 5/282* (2013.01); *B32B 2307/418* (2013.01); *B32B 2309/105* (2013.01)

(58) Field of Classification Search
  CPC . G02B 5/282; G02B 1/11; G02B 1/14; G02B 1/115; B32B 17/06; B32B 27/06; B32B 7/02; B32B 2307/418; B32B 2309/105; C03C 3/16; C03C 3/247; C03C 4/082; C03C 17/007–009; C03C 17/22; C03C 17/361; C03C 17/2605; C03C 17/3607; C03C 17/3613; C03C 17/3618; C03C 2217/48; C03C 2217/70–73; C03C 2217/445; C03C 25/42; C03C 25/52; C03C 25/54; C03C 25/109; C03C 25/1068

USPC ............... 359/359, 580–582, 614, 722, 885; 257/40; 348/294; 501/48
  See application file for complete search history.

(56) References Cited

FOREIGN PATENT DOCUMENTS

| | | | |
|---|---|---|---|
| JP | 3-83834 | | 4/1991 |
| JP | 5-341122 | | 12/1993 |
| JP | 6-16451 | | 1/1994 |
| JP | 8-253341 | | 10/1996 |
| JP | 2004-83290 | | 3/2004 |
| JP | 2006-220873 | | 8/2006 |
| JP | 2006-349775 | | 12/2006 |
| JP | 2006349775 A | * | 12/2006 |
| JP | 2007-41347 | | 2/2007 |
| JP | 2007/156321 | | 6/2007 |
| JP | 2010/210782 | | 9/2010 |
| JP | 2011-132077 | | 7/2011 |
| WO | WO 2014/168189 A1 | | 10/2014 |

OTHER PUBLICATIONS

Written Opinion dated Oct. 25, 2016 in PCT/JP2016/072290, filed on Jul. 29, 2016.

* cited by examiner

OPTICAL FILTER AND NEAR-INFRARED CUT FILTER

CROSS-REFERENCE TO RELATED APPLICATIONS

This application is a continuation of prior International Application No. PCT/JP2016/072290, filed on Jul. 29, 2016 which is based upon and claims the benefit of priority from Japanese Patent Application No. 2015-152252, filed on July 31; the entire contents of all of which are incorporated herein by reference.

FIELD

The present invention relates to an optical filter used for an optical apparatus. The present invention relates particularly to a near-infrared cut filter used as a visibility correction filter of a solid-state imaging sensing device such as a CCD (Charge Coupled Device) or a CMOS (Complementary Metal Oxide Semiconductor) used in a digital still camera or a video camera.

BACKGROUND

A spectral sensitivity of a solid-state imaging sensing device such as a CCD or a CMOS used in a digital still camera or a video camera is featured in having a high sensitivity to light in a near-infrared region, compared with a visibility characteristic of a human being. Accordingly, in general, a visibility correction filter is used in order to adjust a spectral sensitivity of such solid-state imaging sensing devices to the visibility characteristic of the human being.

As such a visibility correction filter, Patent Reference 1 (JP-A H06-16451) discloses a near-infrared cut filter glass whose spectral characteristic is adjusted by making $Cu^{2+}$ ions exist in a glass such as a fluorophosphate glass or a phosphate glass.

Further, there is known a near-infrared cut filter having an excellent characteristic, which is provided with an optical multilayer film where a plurality of high-refractive index layers and low-refractive index layers are alternately stacked, on a surface of the near-infrared cut filter glass as above, in order to accurately determine and sharpen a transmitting wavelength region, to thereby transmit a wavelength (400 to 600 nm) of a visible region efficiently and also cut a wavelength (700 nm) of the near-infrared region sharply (for example, see Patent Reference 2 (JP-A H02-213803)). Other than the above, there is a case where an anti-reflection film is provided on a surface of a near-infrared cut filter glass, for the purpose of suppressing reflection of a glass substrate surface to improve a transmittance.

In a case of a near-infrared cut filter, the optical multilayer film is a film in which high-refractive index layers made of titanium oxide, tantalum oxide, niobium oxide or the like and low-refractive index layers made of silicon oxide or the like are alternately stacked on a glass substrate, for example, and, by setting composing materials, thicknesses, a layer number, or the like of the high-refractive index layer and the low-refractive index layer appropriately, selectively transmits light by using interference of light.

Besides, as an optical apparatus and an imaging apparatus become smaller and thinner, an optical filter such as a near-infrared cut filter to be used is also desired to be thinner in thickness in an optical axis direction. With respect to thinning of a substrate, there was a problem that providing an optical multilayer film on a substrate whose plate thickness is small causes distortion (warpage) of a substrate shape noticeably. To cope with such a problem, there is proposed a method of suppressing warpage of a substrate by setting a ratio of the number of layers of optical multilayer films formed on both front and rear surfaces of the substrate to a predetermined range (over 1 and equal to or less than 2.5) (for example, see Patent Reference 3 (JP-A 2006-220873)).

SUMMARY

However, the optical filter described in Patent Reference 3 requires that an anti-reflection film which is normally constituted by a comparatively small number of layers has quite a large number of layers. The anti-reflection film is constituted by layers of comparatively small physical film thicknesses, and it has been apprehended that a large number of layers may lead to a large reflectance due to a film thickness error. Further, there has been a problem that an increase in layer number of the anti-reflection film impairs ease of film formation, resulting in a decreased productivity of an optical filter.

Further, as a means for resolving occurrence of distortion (warpage) of a substrate shape caused by providing an optical multilayer film on a substrate of small plate thickness, there is also a method of providing a near-infrared cut filter layer being an optical multilayer film on both front and rear surfaces of a glass, to thereby balance a stress of the optical multilayer film. However, since a near-infrared cut filter by means of the optical multilayer film has high dependence of a spectral characteristic on an incident angle of light, there has been an apprehension that a reflectance may become high when the incident angle of light is large.

The present invention is made in view of the above-described problems, and its object is to provide an optical filter with small substrate warpage, and a near-infrared cut filter.

The present invention provides an optical filter which has a substrate, a refractive index adjusting layer on the substrate, a characteristic improving layer having a stress adjustment function on the refractive index adjusting layer, and an optical multilayer film on the characteristic improving layer, wherein the refractive index adjusting layer is constituted by one to three layers, and the characteristic improving layer is a single-layer film whose physical film thickness is 600 nm or more.

In the optical filter of the present invention, when a refractive index of the substrate is indicated as ns, a refractive index of the refractive index adjusting layer is indicated as na, where na is a refractive index of an equivalent film if the refractive index adjusting layer is multilayered, and a refractive index of the characteristic improving layer is indicated as ne, it is preferable that in a case of ns>ne, a relation of ns>na>ne is established, and that in a case of ns<ne, a relation of ns<na<ne is established.

Further, in the optical filter of the present invention, the characteristic improving layer is preferably a resin film or an inorganic film. Further, the characteristic improving layer is preferably made of silicon dioxide ($SiO_2$) or aluminum oxide ($Al_2O_3$), or a mixture at least containing silicon dioxide ($SiO_2$) or aluminum oxide ($Al_2O_3$). Further, the substrate is preferably made of a glass or a resin. Further, the substrate is preferably made of a fluorophosphate glass or a phosphate glass. Further, the substrate preferably has a thickness of 0.22 mm or less. Further, the optical filter preferably has a near-infrared absorbing layer provided between the characteristic improving layer and the optical multilayer film, and the near-infrared absorbing layer preferably includes a transparent resin and an absorbent absorbing a near-infrared ray. Further, the optical multilayer film on the characteristic improving layer preferably has an anti-reflection function.

Further, the present invention provides an optical filter which has a second optical multilayer film on a second surface of the substrate opposite to a first surface of the substrate on which the refractive index adjusting layer and the characteristic improving layer are formed. Besides, in the optical filter, the second optical multilayer film preferably has a total film thickness of 2 μm or more and a total layer number of 20 or more. Further, a ratio between a layer number L2 of the second optical multilayer film and a total layer number on a first surface L1 being total of layer numbers of the first optical multilayer film, the refractive index adjusting layer, and the characteristic improving layer which are formed on the first surface of the substrate preferably satisfies the following formula;

2.5<$L2/L1$≤50.

Further, the second optical multilayer film preferably has an infrared cutting function. Further, the present invention provides a near-infrared cut filter made of the optical filter.

According to the present invention, by a single-layer characteristic improving layer of 600 nm or more in physical film thickness which is formed between a substrate and an optical multilayer film, a film stress caused by formation of the optical multilayer film is alleviated, so that an optical filter in which warpage of the substrate is suppressed can be obtained. Further, since a refractive index adjusting layer is formed between the characteristic improving layer having a stress alleviation (stress adjustment) function as above and the substrate, by adjusting a refractive index of the refractive index adjusting layer to an intermediate refractive index between those of the substrate and the characteristic improving layer, for example, fluctuation of a spectral characteristic due to providing the characteristic improving layer can be suppressed. Accordingly, the optical filter having a good spectral characteristic can be obtained.

MODE FOR CARRYING OUT THE INVENTION

Hereinafter, modes for carrying out the present invention will be described with reference to the drawings.

First Embodiment

Figure 1:
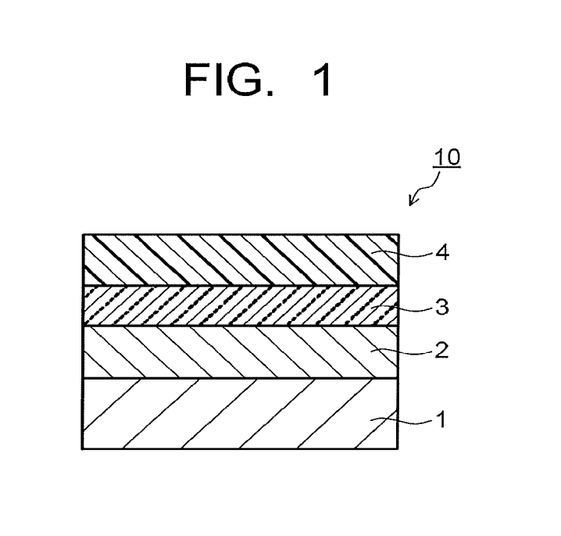
FIG. 1 is a cross-sectional view illustrating a first embodiment of an optical filter of the present invention.

FIG. 1 is a cross-sectional view illustrating a first embodiment of an optical filter of the present invention. An optical filter 10 illustrated in FIG. 1 has a substrate 1, a refractive index adjusting layer 2 and a characteristic improving layer 3 which are formed in sequence on a main surface of the substrate 1, and an optical multilayer film 4 formed on the characteristic improving layer 3. Since the refractive index adjusting layer 2 and the characteristic improving layer 3 are formed in sequence from a substrate 1 side between the substrate 1 and the optical multilayer film 4, the optical filter 10 of the first embodiment enables small warpage of the substrate 1, and in addition, has a good spectral characteristic.

(Substrate)

The substrate 1 is preferably made of a resin or a glass having a high visible light transmittance, and more preferably made of a resin or a glass which absorbs a near-infrared ray, in addition. As the resin, there can be cited a commercially available transparent resin film, and in addition, a cycloolefin-based resin containing a dye (later-described dye (A)) which has absorption in a near-infrared region, for example. Usage of the substrate 1 made of the above-described resin enables thinning of a near-infrared cut filter, for example, and also manufacturing at a low cost. Further, when the substrate 1 is made of the resin, a dye (later-described dye (U)) which absorbs an ultraviolet ray may be contained in addition to the dye (later-described dye (A)) which absorbs the near-infrared ray.

As a glass having a high infrared ray absorptance as well as a high visible light transmittance, there can be cited a fluorophosphate glass and a phosphate glass. Preferable as the fluorophosphate glass is a glass containing 0.5 to 25 parts by mass of CuO in terms of outer percentage in relation to 100 parts by mass of a mother glass in which a total of components including, in mass % based on oxides or fluorides, 10 to 60% of $P_2O_5$, 0 to 20% of $AlF_3$, 1 to 30% of $LiF+NaF+KF$, 10 to 75% of $MgF_2+CaF_2+SrF_2+BaF_2$ (note that up to 70% of a total amount of fluorides can be replaced by oxides) is 90% or more, for example. Note that a word "to" indicating numeric ranges described above is used to mean that numeric values listed before and after the word are included as a lower limit value and an upper limit value. In this specification, the word "to" is used to mean the same as long as not otherwise stated.

The fluorophosphate glass of the above-described composition is excellent in weather resistance, and since containing CuO, has a spectral characteristic suitable for a near-infrared cut filter glass. Further, as the fluorophosphate glass, it is possible to use glasses described in composition ranges or examples disclosed by JP-A H03-83834, JP-A H06-16451, JP-A H08-253341, JP-A 2004-83290, or JP-A 2011-132077, for example, other than the glass of the above-described composition.

In order to obtain a glass substrate, glass materials are mixed and melted so as to attain a desired glass composition as described above, and subsequently, the molten glass is shaped. Then, after an outer shape is processed to have a predetermined size to fabricate the glass substrate, a surface of the glass substrate is subjected to lapping (grinding) and subsequently polishing (precision polishing). Note that in order to obtain the optical filter 10, on the surface of the glass substrate obtained as above, the refractive index adjusting layer 2 and the characteristic improving layer 3 are formed in sequence and thereafter the optical multilayer film 4 is formed, and next, cutting is carried out by using a well-known method (scribing, dicing, laser cutting, or the like) to obtain a predetermined product size.

In view of thinning of the optical filter 10, a thickness of the substrate 1 made of the above-described glass or resin is preferably 0.3 mm or less, more preferably 0.22 mm or less, further preferably 0.18 mm or less, and most preferably 0.15 mm or less. When the thickness of the substrate 1 is 0.22 mm or less, warpage of the substrate 1 is likely to become large, and thus an effect of warpage suppression by formation of the refractive index adjusting layer 2 and the characteristic improving layer 3 can be noticeably obtained. Further, since reducing the thickness of the substrate 1 not only increases a manufacturing cost due to bad productivity but also lowers a strength, breakage is concerned when manufactured or conveyed. Therefore, the thickness of the substrate 1 is preferably 0.025 mm or more, more preferably 0.03 mm or more, and further preferably 0.05 mm or more.

(Characteristic Improving Layer)

In the first embodiment of the present invention, the characteristic improving layer 3 is a single-layer film of 600 nm or more in physical film thickness, and acts to suppress warpage of the substrate 1 by balancing a stress due to a second optical multilayer film in a case where the second optical multilayer film such as a near-infrared cut filter layer is provided on an opposite surface (second surface) of the substrate 1 opposite to the surface (first surface) having the refractive index adjusting layer, the characteristic improving layer and optical multilayer film, as will be described later.

When the physical film thickness of the characteristic improving layer 3 is less than 600 nm, a function to alleviate the stress applied to the substrate 1 by the second optical multilayer film is not sufficient, so that warpage of the substrate 1 cannot be suppressed sufficiently. In view of ease (productivity) of film formation and thinning of the entire optical filter 10, the physical film thickness of the characteristic improving layer 3 is preferably 10000 nm or less and equal to or less than a physical film thickness of the second optical multilayer film which will be described later. The physical film thickness of the characteristic improving layer 3 is preferably 700 nm or more, more preferably 800 nm or more, and further preferably 900 nm or more. Further, the physical film thickness of the characteristic improving layer 3 is preferably 7000 nm or less, more preferably 5000 nm or less, and further preferably 4000 nm or less.

The characteristic improving layer 3 is preferably an inorganic film, and in particular, is preferably made of silicon oxide ($SiO_2$) or aluminum oxide ($Al_2O_3$), or a mixture at least containing the above. The reason is described below. As will be described later, in view of suppressing fluctuation of a spectral characteristic due to formation of the refractive index adjusting layer 2 and the characteristic improving layer 3, a refractive index of each layer is preferably adjusted to establish a magnitude relation of ns>na>ne or ns<na<ne. Here, "ns" indicates the refractive index of the substrate 1, "na" indicates the refractive index of the refractive index adjusting layer 2 (the refractive index as an equivalent film in a case where the refractive index adjusting layer is multi-layered), and "ne" indicates the refractive index of the characteristic improving layer 3. Note that in this specification, the refractive index means a refractive index at a wavelength of 530 nm. Further, when the characteristic improving layer 3 is the inorganic film, the characteristic improving layer 3 may be constituted by using $MgF_2$, $TiO_2$, $Ta_2O_5$, $Nb_2O_5$, or $ZrO_2$.

In other words, in a case where the substrate 1 is the glass substrate, the characteristic improving layer 3 is preferably made of $SiO_2$ or $Al_2O_3$, which is comparatively close to the substrate 1 in terms of refractive index and inexpensive as a film material to be used generally, or a mixture at least containing the above.

The characteristic improving layer 3 is preferably formed by a sputtering method or an ion assisted deposition method.

A film formed by the sputtering method or the ion assisted deposition method is dense and high in hardness, resulting in being hard to be scratched and excellent in moisture resistance and alkali resistance, compared with a film formed by a deposition method not using ion assist. Therefore, the characteristic improving layer 3 formed by the sputtering method or the ion assisted deposition method also functions as a barrier film having moisture resistance and alkali resistance. Here, the ion assisted deposition method is a method of making high kinetic energy of ions act during film formation by a vacuum deposition method, to make a dense film or to increase an adhesion strength of a coating film, and for example, an ion beam deposition method, an ion plating deposition method and so on are known. Meanwhile, the deposition method not using ion assist is a deposition method not using ion beam or ion plating described above.

Further, the characteristic improving layer 3 may be formed by a vacuum deposition method (not using ion assist). Usage of the vacuum deposition method enables a lower apparatus cost, to thereby suppress a manufacturing cost. Further, it is possible to obtain a film having less adhesion of foreign substances or the like in forming the characteristic improving layer 3.

The characteristic improving layer 3 may be a resin film. For example, in a case where the optical filter 10 is given a near-infrared cutting function, a dye having an absorption function in a near-infrared region may be dispersed in a resin, and then the resin film is formed on the substrate 1. When the resin film is shaped on the substrate 1, it is difficult to make a film thickness of the resin film uniform, depending on a forming method, leading to a concern that a spectral characteristic is affected. However, by forming the characteristic improving layer 3 after providing the refractive index adjusting layer 2 on the substrate 1, influence caused by variability in film thickness of the characteristic improving layer 3 (resin film) on the spectral characteristic can be suppressed.

Examples of resin materials constituting the characteristic improving layer 3 include an acrylic resin, an epoxy resin, an ene-thiol resin, a polycarbonate resin, a polyether resin, a polyarylate resin, a polysulfone resin, a polyethersulfone resin, a polyparaphenylene resin, a polyester resin, a polyimide resin, a polyamide-imide resin, a polyolefin resin, a cyclic olefin resin, and so on. Further, the characteristic improving layer 3 may be made to have further an infrared absorbing function by adding, to the above resin material, a dye (azo-based, aminium-based, anthraquinone-based, cyanine-based, diimonium-based, dithiol metal complex-based, squarylium-based, naphthalocyanine-based, phthalocyanine-based, or the like) having absorption in the near-infrared region. Further, a dye (dye (U) described later) having an absorption function in an ultraviolet region may be made to be contained in addition to the dye having absorption in the near-infrared region.

In particular, as a resin high in glass transition temperature (Tg), preferable is one kind or more selected from the polyester resin, the polycarbonate resin, the polyethersulfone resin, the polyarylate resin, the polyimide resin, and the epoxy resin. Further, one kind or more selected from the polyester resin and the polyimide resin is more preferable, and the polyimide resin is particularly preferable. As the polyester resin, a polyethylene terephthalate resin, a polyethylene naphthalate resin, and so on are preferable.

(Refractive Index Adjusting Layer)

In the first embodiment of the present invention, the refractive index adjusting layer 2 whose layer number is 1 to 3 is provided between the substrate 1 and the characteristic improving layer 3. The refractive index adjusting layer 2 is a layer functioning to suppress fluctuation of a spectral characteristic due to providing the characteristic improving layer 3.

The refractive index adjusting layer 2 is preferably a layer having the refractive index na which is intermediate between the refractive index ns of the substrate 1 and the refractive index ne of the characteristic improving layer 3. More specifically, in a case where the refractive index ns of the substrate 1 is higher than the refractive index ne of the characteristic improving layer 3 (ns>ne), the refractive index na of the refractive index adjusting layer 2 is set to a value establishing the relation of ns>na>ne, and in a case where the refractive index ns of the substrate 1 is lower than the refractive index ne of the characteristic improving layer 3 (ns<ne), the refractive index na of the refractive index adjusting layer 2 is set to a value establishing the relation of ns<na<ne. When the refractive index adjusting layer 2 is a single layer, the refractive index na of the refractive index adjusting layer 2 is a refractive index of that layer, and when the refractive index adjusting layer 2 is multi-layered (two-layered or three-layered), the refractive index na of the refractive index adjusting layer 2 is a refractive index as an equivalent film.

By forming the refractive index adjusting layer 2 having such a refractive index na, it is possible to suppress fluctuation of the spectral characteristic caused by formation of the characteristic improving layer 3. In other words, though the spectral characteristic of the optical filter 10 may fluctuate from the spectral characteristic of the optical multi-layer film 4 depending on the physical film thickness of the characteristic improving layer 3, fluctuation of the spectral characteristic of the optical filter 10 can be suppressed by interposing the refractive index adjusting layer 2 having the refractive index na intermediate between those of the substrate 1 and the characteristic improving layer 3 therebetween, so that it is possible to provide the optical filter 10 maintaining the excellent spectral characteristic the optical multilayer film 4 has.

The equivalent film is a film to create a configuration equivalent to a single-layer film of a desired refractive index by using a periodic symmetrical three-layer film of a thin film with two different refractive indices, based on the equivalent film theory (theoretically developed by L. I. Epstein: 1952, P. H. Berning: 1962, Kimura: 1973, and so on). The equivalent film in the refractive index adjusting layer 2 of the present invention can be designed by the following method. First, since a refractive index of a film material has wavelength dependence, a wavelength band important as an optical filter is selected. For example, with respect to an anti-reflection film in a wavelength of a visible region, the refractive index is considered at a wavelength of 530 nm. Next, an intermediate value of the refractive index of the substrate 1 and the refractive index of the characteristic improving layer 3 is set as a target refractive index of the refractive index adjusting layer 2 (equivalent film), and then the equivalent film for 1×QWOT (Quarter Wave Optical Thickness, ¼ wavelength) is designed.

For the equivalent film, it is preferable to use the symmetrical three-layer film because of ease of designing, but the symmetrical three-layer film is not necessarily used. For example, though a structure may be somewhat deviated from a structure of the symmetrical three-layer film by optimization designing of a spectral characteristic, an effect as a refractive index adjusting layer can be obtained if a refractive index of an equivalent film is not largely deviated from a target refractive index. Though two layers can sometimes constitute an equivalent film, it is fundamental to adjust a refractive index by a balance of a film thickness proportion between a high refractive index film and a low refractive index film, similarly to the symmetrical three-layer film.

If the refractive index of the refractive index adjusting layer 2 is within a range of ±20% from the intermediate value between the refractive indices of the substrate 1 and the characteristic improving layer 3, its effect can be obtained. The refractive index of the refractive index adjusting layer 2 is preferably within a range of ±10% from the intermediate value between those of the substrate 1 and the characteristic improving layer 3, and more preferably within a range of ±5%. If the refractive index of the refractive index adjusting layer 2 is out of the range of ±20% from the intermediate value between those of the substrate 1 and the characteristic improving layer 3, the spectral characteristic of the optical filter 10 fluctuates depending on the film thickness of the characteristic improving layer 3, and thus such a refractive index is not preferable.

In the refractive index adjusting layer 2 made of 1 to 3 layers, as a material constituting each layer, there can be cited $SiO_2$ (refractive index: 1.48), $Al_2O_3$ (refractive index: 1.64), $MgF_2$ (refractive index: 1.42), a mixture of $Al_2O_3$ and $ZrO_2$ (composite oxide, refractive index: 1.67), and so on. The material to constitute each layer is selected and used so that the refractive index na of the refractive index adjusting layer 2 has the intermediate value between the refractive index ns of the substrate 1 and the refractive index ne of the characteristic improving layer 3. Note that every refractive index in the specification means a refractive index of light of 530 nm in wavelength.

When a substrate made of a fluorophosphate glass or a phosphate glass is used as the substrate 1, it is preferable to use a single-layer film of aluminum oxide, which has a good adhesiveness to the substrate 1, as the refractive index adjusting layer 2. The refractive index adjusting layer 2 may be any one of a single-layer film, two-layered, and three-layered, and when a productivity is taken into consideration, the single-layer film is preferable. Further, in order to obtain an effect to suppress fluctuation of the spectral characteristic due to providing the characteristic improving layer 3 more surely, being two-layered or three-layered is preferable.

When the substrate 1 is made of a fluorophosphate glass or the like, it is preferable to form each layer of the refractive index adjusting layer 2 made of the above materials by a deposition method not using ion assist. Forming by the deposition method not using ion assist makes hardness and denseness of a film comparatively low, bringing about an effect that peeling is hard to occur between the substrate 1 and the refractive index adjusting layer 2. If there is no concern that peeling occurs between the substrate 1 and the refractive index adjusting layer 2, the refractive index adjusting layer 2 may be formed by a sputtering method or a deposition method using ion assist.

An optical film thickness (refractive index na×physical film thickness of the entire layer of the refractive index adjusting layer 2) of the entire layer of the refractive index adjusting layer 2 is preferably 1×QWOT. The reason thereof being not clear, when the optical film thickness of the refractive index adjusting layer 2 is other than 1 QWOT, operation and effect as the refractive index adjusting layer 2 cannot be obtained sufficiently. Note that with respect to the physical film thickness of the refractive index adjusting layer 2, some fluctuation is allowed, for the purpose of adjustment of the optical characteristic.

(Optical Multilayer Film)

The optical filter 10 of the first embodiment of the present invention has the optical multilayer film 4 on the characteristic improving layer 3. The optical multilayer film 4 is selected appropriately in compliance with an intended purpose, and examples thereof include an anti-reflection film (hereinafter, also referred to as an AR film) having an anti-reflection function, an infrared cut filter film (hereinafter, also referred to as an IRCF film), an ultraviolet cut filter film, an ultraviolet and infrared cut filter film, and so on. Further, the optical multilayer film 4 may be a film having both functions of the AR film and the IRCF film.

As the optical multilayer film 4 having such a function, there is used a stacked film in which a plurality of low-refractive index films and high-refractive index films are alternately disposed, for example. As the low-refractive index film, a $SiO_2$ film or the like is used. As the high-refractive index film, a film made of at least one kind of metal oxide or the like selected from $Nb_2O_5$, $TiO_2$, and $Ta_2O_5$ is used. A film thickness and a stack number of the low-refractive index film and the high-refractive index film are set appropriately in compliance with the optical characteristic required of the optical multilayer film 4.

The optical multilayer film 4 is formed by the sputtering method or the ion assisted deposition method. The film formed by the sputtering method or the ion assisted deposition method is quite small in change of a spectral characteristic under a high temperature and a high humidity compared with a film formed by the deposition method not using ion assist, and thus has an advantage that a non-shift film practically without spectral change can be materialized. Further, the films formed by these methods are dense and high in hardness, resulting in being hard to be scratched and excellent in terms of handleability in a part assembling process or the like. Therefore, the sputtering method and the ion assisted deposition methods are suitable as a film-forming method for an optical multilayer film of a near-infrared cut filter which is used as a visibility correction filter of a solid-state imaging sensing device.

Further, the optical multilayer film 4 may be formed by a vacuum deposition method (not using ion assist). Usage of the above deposition method enables a low apparatus cost, leading to suppression of a manufacturing cost. Further, it is possible to obtain a film having less adhesion of foreign substances or the like in forming the optical multilayer film 4.

In the optical filter 10 having such a structure, on a second surface opposite to a surface (first surface) where the refractive index adjusting layer 2 and the characteristic improving layer 3 of the substrate 1 are formed, of the substrate 1, a second optical multilayer film is formed and used as an optical filter such as a near-infrared cut filter.

(Other Layers)

The optical filter 10 may have a near-infrared absorbing layer which is not shown in FIG. 1 between the characteristic improving layer 3 and the optical multilayer film 4. In that case, the characteristic improving layer 3 is only required to be an inorganic film, and a film made of $SiO_2$ or $Al_2O_3$, or a mixture containing $SiO_2$ or $Al_2O_3$ is preferable, and a film made of $SiO_2$ is more preferable. The near-infrared absorbing layer is only required to have a function to absorb a near-infrared ray, and is more preferable to have a function to absorb also an ultraviolet ray in addition to the near-infrared ray. In a constitution in which the optical filter 10 has the near-infrared absorbing layer, there can be exemplified a combination of a glass substrate as the substrate 1, an inorganic film consisting of 1 to 3 layers as the refractive index adjusting layer 2, and an inorganic film of a single layer of 600 nm or more in thickness as the characteristic improving layer 3. In a case of the above combination, further, the combination may be a combination of a fluorophosphate glass substrate or a phosphate glass substrate as the substrate 1, a single-layered $Al_2O_3$ film as the refractive index adjusting layer 2, and a film made of $SiO_2$ as the characteristic improving layer 3.

The near-infrared absorbing layer is made of a resin layer obtained by uniformly dissolving or dispersing an absorbent such as a dye absorbing a predetermined wavelength in a transparent resin, and by having this absorbing layer, it is possible to obtain an effect that fluctuation by an incident angle (incident angle dependency) can be suppressed, particularly in a spectral characteristic. As the absorbent, it is only required that an absorbent absorbing a near-infrared ray is included, and it is more preferable that an ultraviolet absorbent is also included. As the near-infrared absorbent and the ultraviolet absorbent, a near-infrared absorbing dye (hereinafter, referred to as a "dye (A)") and an ultraviolet absorbing dye (hereinafter, referred to as a "dye (U)") can be cited, respectively.

As the dye (A), one whose absorption maximum wavelength when uniformly dissolved or dispersed in the transparent resin falls within 600 to 1200 nm is suitable. One whose absorption maximum wavelength falls within 600 to 1000 nm is more preferable and one whose absorption maximum wavelength falls within 600 to 850 nm is most preferable. Concretely, as the dye (A), there can be cited dyes of diimmonium base, cyanine base, phthalocyanine base, naphthalocyanine base, dithiol metal complex base, azo base, aminium base, polymethine base, phthalide base, naphthoquinone base, anthraquinone base, indophenol base, pyrylium base, thiopyrylium base, squarylium base, croconium base, tetra-dehydrocholine base, triphenylmethane base, and so on.

As the dye (U), one whose absorption maximum wavelength when uniformly dissolved or dispersed in the transparent resin falls within 360 to 415 nm is suitable. Concretely, as the dye (U), there can be cited dyes of oxazole base, merocyanine base, cyanine base, naphthalimide base, oxadiazole base, oxazine base, oxazolidine base, naphthalic acid base, styryl base, anthracene base, cyclic carbonyl base, triazole base, and so on.

As the transparent resin included in the absorbing layer, there can be cited an acrylic resin, an epoxy resin, an ene-thiol resin, a polycarbonate resin, a polyether resin, a polyarylate resin, a polysulfone resin, a polyethersulfone resin, a polyparaphenylene resin, a polyester resin, a polyimide resin, a polyamide-imide resin, a polyolefin resin, a cyclic olefin resin, and so on. In particular, as the resin high in glass transition temperature (Tg), preferable is one kind or more selected from the polyester resin, the polycarbonate resin, the polyethersulfone resin, the polyarylate resin, the polyimide resin, and the epoxy resin. Further, as the transparent resin, one kind or more selected from the polyester resin and the polyimide resin is more preferable, and the polyimide resin is particularly preferable. As the polyester resin, a polyethylene terephthalate resin, a polyethylene naphthalate resin, and so on are preferable.

A thickness of the absorbing layer may be 0.1 to 100 μm in each case where the absorbing layer is a single layer or a multiple layer. When the thickness of the absorbing layer is less than 0.1 μm, a desired absorption characteristic may not be able to be obtained, and when the thickness is over 100 μm, flatness of the absorbing layer is reduced, so that in-plane variation of a light absorption characteristic may occur. The thickness of the absorbing layer is preferably 0.3 μm or more, and more preferably 0.5 μm or more. Further, the thickness of the absorbing layer is preferably 50 μm or less, more preferably 10 μm or less, and further preferably 2 μm or less.

Second Embodiment

Figure 2:
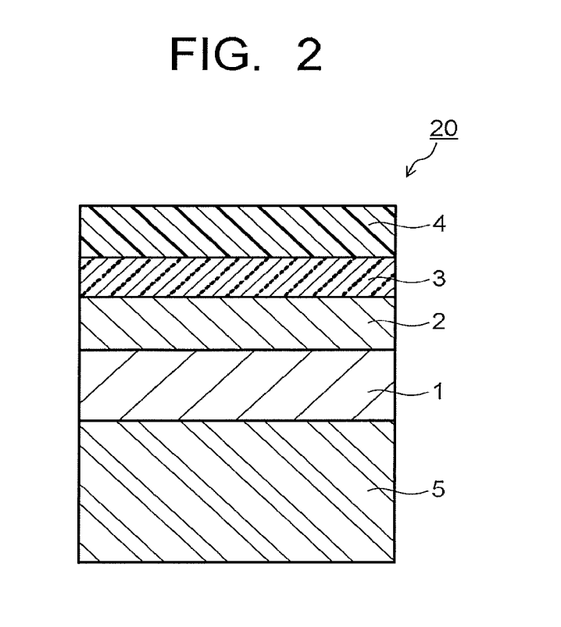
FIG. 2 is a cross-sectional view illustrating a second embodiment of the optical filter of the present invention.

FIG. 2 is a cross-sectional view illustrating a second embodiment of the present invention. An optical filter 20 illustrated in FIG. 2 has a second optical multilayer film 5 on a surface (hereinafter, referred to as a second surface) opposite to a surface (hereinafter, referred to as a first surface) of a substrate 1 of the first embodiment, on which an optical multilayer film 4 is formed via a refractive index adjusting layer 2 and a characteristic improving layer 3. Hereinafter, the optical multilayer film 4 formed on a first surface of the substrate 1 is referred to as a first optical multilayer film. Note that since the second embodiment has a configuration similar to that of the first embodiment except that the second embodiment has the second optical multilayer film 5, description of a part overlapping that of the first embodiment will be appropriately omitted.

(Second Optical Multilayer Film)

The second optical multilayer film 5 formed on the second surface of the substrate 1 can be selected appropriately in compliance with an intended purpose. For example, there can be cited an anti-reflection film (AR film), an infrared cut filter film (IRCF film), an ultraviolet cut filter film, an ultraviolet and infrared cut filter film, a band pass filter film (hereinafter, referred to as a BPF film), and so on. Further, one which has functions of both AR film and IRCF film may be selected.

Besides, as the second optical multilayer film 5, there is used a stacked film in which a plurality of high-refractive index films and low-refractive index films are alternately disposed, similarly to the first optical multilayer film 4 formed on the first surface of the substrate 1. As the low-refractive index film, a $SiO_2$ film or the like is used, and as the high-refractive index film, a film made of at least one kind of metal oxide or the like selected from $Nb_2O_5$, $TiO_2$, and $Ta_2O_5$ is used. Film thicknesses and stack numbers of the low-refractive index film and the high-refractive index film are set appropriately in compliance with an optical characteristic required of the second optical multilayer film 5. The second optical multilayer film 5 is also preferable to be formed by using a sputtering method or an ion assisted deposition method, similarly to the first optical multilayer film 4. Further, the second optical multilayer film 5 may be constituted by three or more film kinds using also an intermediate-refractive index film having a refractive index intermediate between those of the aforementioned low-refractive index film and high-refractive index film.

In the optical filter 20 of the second embodiment of the present invention, as combinations of the first optical multilayer film 4 and the second optical multilayer film 5, there are AR film and AR film, AR film and IRCF film, IRCF film and IRCF film, IRCF film and ultraviolet and infrared cut filter film, and so on. When the optical filter 20 is a near-infrared cut filter, it is preferable that the first optical multilayer film 4 is the AR film and that the second optical multilayer film 5 is the IRCF film. Besides, the second optical multilayer film 5 being the IRCF film is preferable to have a total film thickness of 2 μm or more and a total layer number of 20 layers or more.

Further, as the second optical multilayer film 5, in the optical filter 20 having the IRCF film of 2 μm or more in total film thickness and 20 layers or more in total layer number, it is preferable that a ratio between a layer number L2 of the second optical multilayer film formed on the second surface of the substrate 1 and a total L1 of the number of layers formed on a first surface of the substrate 1 satisfies the following formula.

$2.5 < L2/L1 \leq 50$

Note that the total L1 of the number of the layers formed on the first surface of the substrate 1 is a total of the layer number of the first optical multilayer film 4, the layer number being 1 to 3 of the refractive index adjusting layer, and the layer number being 1 of the characteristic improving layer.

In a case where the ratio (L2/L1) between the layer numbers of both surfaces of the substrate 1 is 2.5 or less, the layer number of the first optical multilayer film 4, for example being the AR film, becomes large when the layer number of the second optical multilayer film 5 becomes large, and thus ease of film formation of the AR film is impaired. By setting the L2/L1 to the above-described range, the layer number of the first optical multilayer film 4, for example being the AR film, on the first surface can be made small even when the second optical multilayer film 5, for example being the IRCF film or the BPF film, is constituted by quite a large number of layers. In other words, even if the layer number of the first optical multilayer film 4, for example being the AR film, is small, it is possible to sufficiently increase effects of fluctuation suppression of a spectral characteristic and warpage suppression of the substrate 1, which leads to ease of film formation of the AR film and a high productivity.

An upper limit of L2/L1 is not particularly limited, but realistically, $L2/L1 \leq 50$ can be set, since an optical filter whose second optical multilayer film 5 has 200 layers or more is almost for a specific purpose such as a narrow-band BPF used in optical communication or the like.

EXAMPLES

Hereinafter, examples of the present invention will be described. Note that Examples 1 to 3, Examples 7 to 9, and Examples 12 to 17 are examples of the present invention, and Examples 4 to 6 and Example 10 are comparative examples. Further, Example 11 is a reference example used for calculating warpage amounts of substrates of optical filters of Examples 7 to 10. A spectral characteristic of each example of FIG. 3 to FIG. 6 was calculated by using simulation software (TF Calc, manufactured by Software Spectra, Inc.). Note that if a condition such as dispersion of a film is accurate, the spectral characteristic calculated by using the simulation software coincides with a spectral characteristic of an optical filter formed by using a deposition apparatus.

Example 1

As a glass substrate, there was used one obtained by precision-polishing main surfaces of a fluorophosphate glass plate (product name: NF-50, manufactured by AGC TECHNO GLASS CO., LTD., size: 50 mm×50 mm, thickness: 0.22 mm). Then, on one of the main surfaces of the glass substrate, there were formed, in sequence from a substrate side, a refractive index adjusting layer in which a mixture film (hereinafter, referred to as an $Al_2O_3$—$ZrO_2$ mixture film) of $Al_2O_3$ and $ZrO_2$, a $MgF_2$ film, and an $Al_2O_3$—$ZrO_2$ mixture film are stacked in sequence, an $SiO_2$ film being a characteristic improving layer, and an AR film in which six layers in total of $TiO_2$ films (refractive index: 2.44) being high-refractive index films and $SiO_2$ films (refractive index: 1.48) being low-refractive index films are alternately stacked as an optical multilayer film, to thereby obtain an optical filter. Table 1 shows film materials constituting respective films and physical film thicknesses (hereinafter, also referred simply to as film thicknesses) in the optical filter in Example 1.

Note that the $AlO_3$—$ZrO_2$ mixture film and the $MgF_2$ film which constitute the refractive index layer were formed by a deposition method not using ion assist. Further, the $SiO_2$ film being the characteristic improving layer and the AR film in which six layers in total of $TiO_2$ films and $SiO_2$ films are alternately stacked were formed by a deposition method using ion assist.

TABLE 1

| Layer number | Film material | Physical film thickness [nm] | Kind of layer |
|---|---|---|---|
| 1 | $Al_2O_3 + ZrO_2$ | 15.56 | Refractive index adjusting layer |
| 2 | $MgF_2$ | 32.33 | |
| 3 | $Al_2O_3 + ZrO_2$ | 20.27 | |
| 4 | $SiO_2$ | 1776.28 | Characteristic improving layer |
| 5 | $TiO_2$ | 12.04 | AR film |
| 6 | $SiO_2$ | 35.90 | |
| 7 | $TiO_2$ | 53.34 | |
| 8 | $SiO_2$ | 6.87 | |
| 9 | $TiO_2$ | 41.63 | |
| 10 | $SiO_2$ | 87.56 | |
| Total of physical film thicknesses [nm] | | 2081.78 | |

Examples 2, 3

A film thickness of a $SiO_2$ film being a characteristic improving layer was set to 720 nm in Example 2 and 3000 nm in Example 3. Other than the above, materials (film materials) constituting respective layers and film thicknesses were set to the same as those in Example 1, to thereby fabricate optical filters.

Example 4

On a main surface of a fluorophosphate glass plate (product name: NF-50, manufactured by AGC TECHNO GLASS CO., LTD., size: 50 mm×50 mm, thickness: 0.22 mm), there was formed an AR film in which six layers in total of $TiO_2$ films and $SiO_2$ films were alternately stacked by a deposition method using ion assist, without formation of a refractive index adjusting layer and a characteristic improving layer. Thereby, an optical filter having only the AR film on a glass substrate was fabricated. Table 2 shows film materials constituting respective films and film thicknesses in the optical filter of Example 4.

TABLE 2

| Layer number | Film material | Physical film thickness [nm] | Kind of layer |
|---|---|---|---|
| 1 | $SiO_2$ | 0 | Characteristic improving layer |
| 2 | $TiO_2$ | 13.76 | AR film |
| 3 | $SiO_2$ | 29.43 | |
| 4 | $TiO_2$ | 57.80 | |

TABLE 2-continued

| Layer number | Film material | Physical film thickness [nm] | Kind of layer |
|---|---|---|---|
| 5 | $SiO_2$ | 6.87 | |
| 6 | $TiO_2$ | 37.21 | |
| 7 | $SiO_2$ | 86.94 | |
| Total of physical film thicknesses [nm] | | 232.01 | |

Example 5

On a main surface of a fluorophosphate glass plate (product name: NF-50, manufactured by AGC TECHNO GLASS CO., LTD., size: 50 mm×50 mm, thickness: 0.22 mm), there were formed a $SiO_2$ film being a characteristic improving layer, and an AR film in which six layers in total of $TiO_2$ films being high-refractive index layers and $SiO_2$ films being low-refractive index layers are alternately stacked, by a deposition method using ion assist, without formation of a refractive index adjusting layer, to thereby obtain an optical filter. Table 3 shows film materials constituting respective films and film thicknesses in the optical filter of Example 5.

TABLE 3

| Layer number | Film material | Physical film thickness [nm] | Kind of layer |
|---|---|---|---|
| 1 | $SiO_2$ | 720 | Characteristic improving layer |
| 2 | $TiO_2$ | 13.76 | AR film |
| 3 | $SiO_2$ | 29.43 | |
| 4 | $TiO_2$ | 57.80 | |
| 5 | $SiO_2$ | 6.87 | |
| 6 | $TiO_2$ | 37.21 | |
| 7 | $SiO_2$ | 86.94 | |
| Total of physical film thicknesses [nm] | | 952.01 | |

Example 6

A film thickness of a $SiO_2$ film being a characteristic improving layer was set to 3000 nm. Other than the above, materials (film materials) constituting respective layers and film thicknesses were set to the same as those in Example 5, to thereby fabricate an optical filter.

In the optical filters of Examples 1 to 3, Table 4 shows refractive index (ns) of the glass substrate, a refractive index (na) of the refractive index adjusting layer, and a refractive index (ne) of the $SiO_2$ film being the characteristic improving layer. Note that all those refractive indices are refractive indices of light of 530 nm in wavelength. Further, the refractive index (na) of the refractive index adjusting layer is a refractive index as an equivalent film of the refractive index adjusting layer constituted by three films.

TABLE 4

| Example or Comparative example | | Refractive index of substrate (ns) | Refractive index of refractive index adjusting layer (na) | Refractive index of characteristic improving layer (ne) |
|---|---|---|---|---|
| Example 1 | Example | 1.573 | 1.527 | 1.48 |
| Example 2 | Example | 1.573 | 1.527 | 1.48 |
| Example 3 | Example | 1.573 | 1.527 | 1.48 |

From Table 4, it is found that a relation of ns>na>ne is established in the optical filters of Examples 1 to 3.

Figure 3:
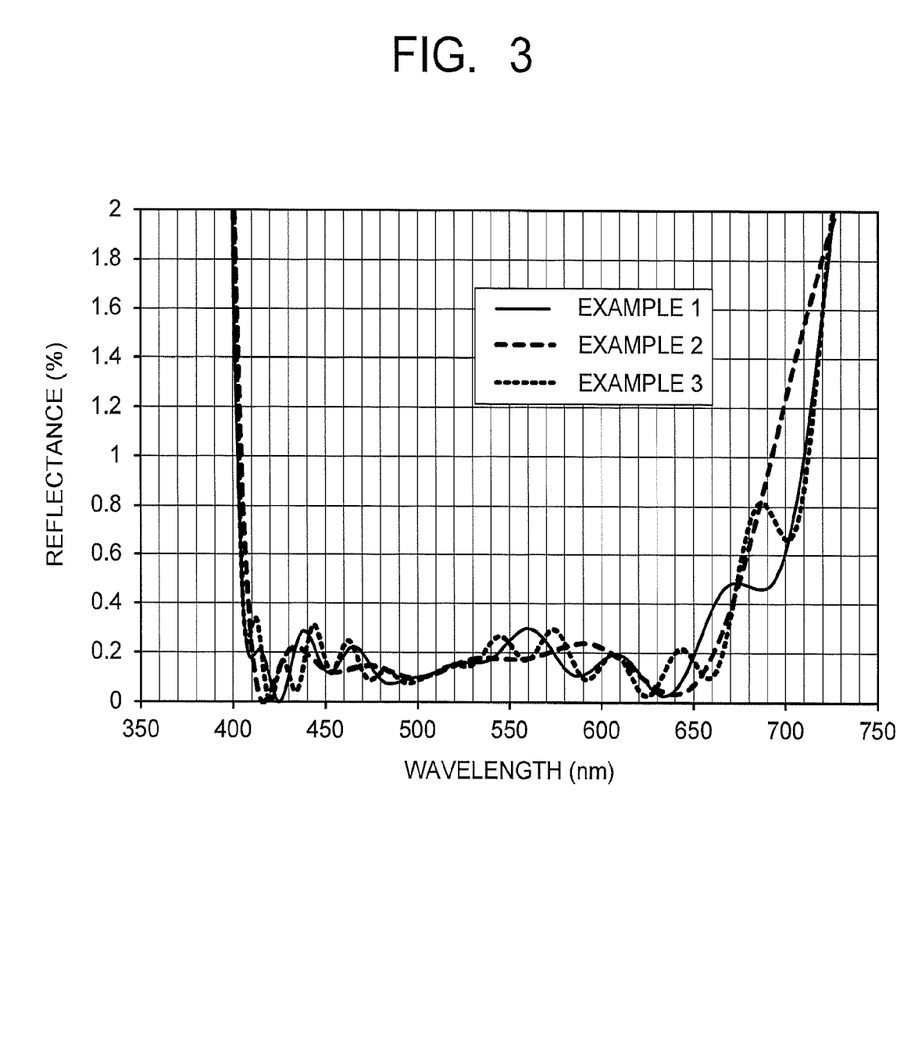
FIG. 3 is a graph illustrating spectral characteristics (spectral reflectances) of optical filters obtained in Example 1 to Example 3.
Figure 4:
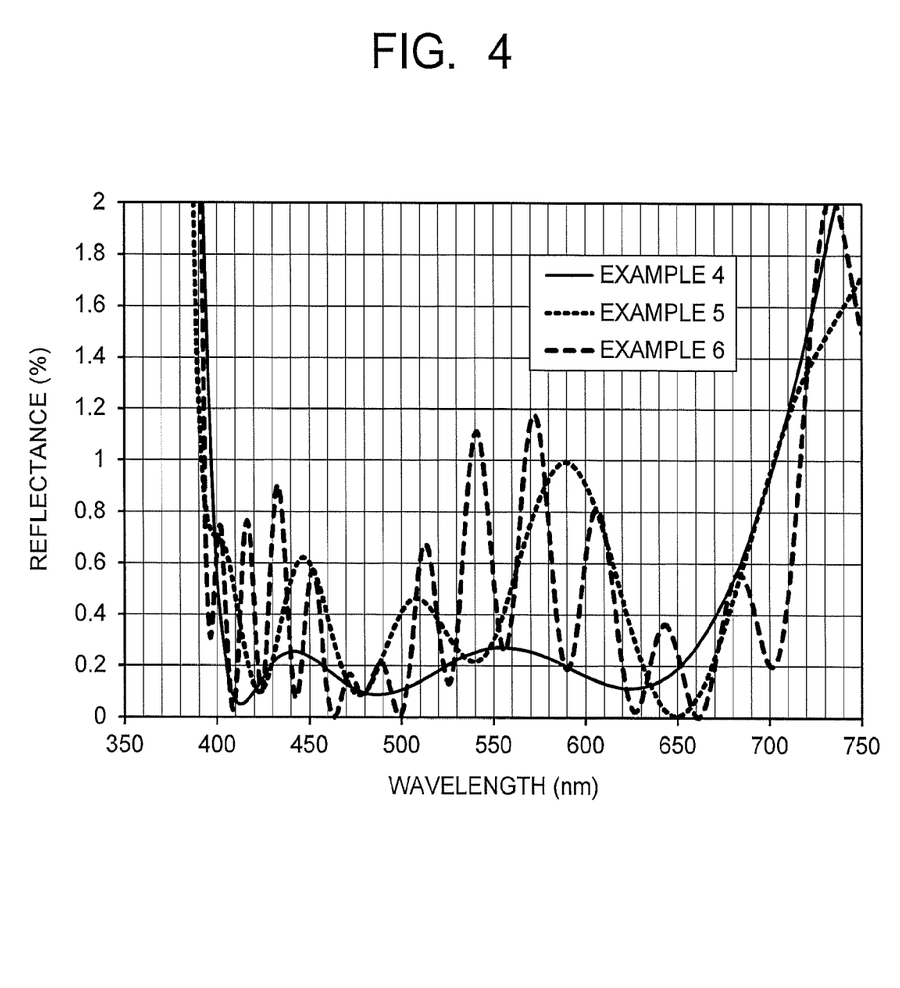
FIG. 4 is a graph illustrating spectral characteristics (spectral reflectances) of optical filters obtained in Example 4 to Example 6.

Next, spectral characteristics (spectral reflectance) at wavelengths 350 nm to 750 nm of the optical filters of Examples 1 to 6 are illustrated in FIG. 3 and FIG. 4.

The following is found from graphs of FIG. 3 and FIG. 4. From comparison between the spectral characteristics of the optical filters of Examples 1 to 3 and the spectral characteristic of the optical filter of Example 4, it is found that providing the refractive index adjusting layer and the characteristic improving layer does not cause a negative effect on the spectral characteristic. Besides, from comparison between the spectral characteristic of the optical filter of Example 1 and the spectral characteristics of the optical filters of Examples 2 to 3, it is found that even if the physical film thickness of the characteristic improving layer changes, the spectral characteristic hardly changes. Further, from comparison between the spectral characteristics of the optical filters of Examples 5, 6 and the spectral characteristic of the optical filter of Example 4, it is found that when the characteristic improving layer exists and the refractive index adjusting layer is absent, the spectral characteristics at the wavelengths of 350 to 750 nm are considerably disordered.

Examples 7 to 10

In each of the optical filters of Examples 1 to 4, an IRCF film (near-infrared cut filter) is formed on a surface (second surface) opposite to a forming surface (first surface) of the AR film or the like of the glass substrate, to thereby obtain optical filters of Examples 7 to 10. As the IRCF film, there was formed an alternately stacked film (layer number: 38 layers, total film thickness 4.5 μm) obtained by repeatedly stacking a base layer made by stacking a $TiO_2$ film and a $SiO_2$ film in this order, by a deposition method using ion assist. Table 5 shows details of a film configuration of the IRCF film.

TABLE 5

| Film layer number | Film material | Film thickness [nm] |
|---|---|---|
| 1 | $TiO_2$ | 14.27 |
| 2 | $SiO_2$ | 46.12 |
| 3 | $TiO_2$ | 21.40 |
| 4 | $SiO_2$ | 182.52 |
| 5 | $TiO_2$ | 90.48 |
| 6 | $SiO_2$ | 148.42 |
| 7 | $TiO_2$ | 84.17 |
| 8 | $SiO_2$ | 143.90 |
| 9 | $TiO_2$ | 82.70 |
| 10 | $SiO_2$ | 142.37 |
| 11 | $TiO_2$ | 82.08 |
| 12 | $SiO_2$ | 141.76 |
| 13 | $TiO_2$ | 81.79 |
| 14 | $SiO_2$ | 141.46 |
| 15 | $TiO_2$ | 81.64 |
| 16 | $SiO_2$ | 142.10 |
| 17 | $TiO_2$ | 81.71 |
| 18 | $SiO_2$ | 142.49 |
| 19 | $TiO_2$ | 82.59 |
| 20 | $SiO_2$ | 144.51 |
| 21 | $TiO_2$ | 83.62 |
| 22 | $SiO_2$ | 148.35 |
| 23 | $TiO_2$ | 88.93 |
| 24 | $SiO_2$ | 160.79 |
| 25 | $TiO_2$ | 102.11 |
| 26 | $SiO_2$ | 179.04 |
| 27 | $TiO_2$ | 102.44 |
| 28 | $SiO_2$ | 165.06 |
| 29 | $TiO_2$ | 100.03 |
| 30 | $SiO_2$ | 180.00 |
| 31 | $TiO_2$ | 112.35 |
| 32 | $SiO_2$ | 189.41 |
| 33 | $TiO_2$ | 114.19 |
| 34 | $SiO_2$ | 190.21 |
| 35 | $TiO_2$ | 113.83 |
| 36 | $SiO_2$ | 187.47 |
| 37 | $TiO_2$ | 113.45 |
| 38 | $SiO_2$ | 95.55 |

TABLE 5-continued

In the optical filters of Examples 7 to 10, Table 6 shows total film thicknesses (total of physical film thicknesses of the refractive index adjusting layer, the characteristic improving layer, and the AR film) of layers formed on the first surfaces of the glass substrates, and the film thicknesses of the IRCF films formed on the second surfaces, respectively. Note that in the optical filters of Examples 7 to 9, each ratio (ratio between a layer number (L2) of IRCF film and a total of layer numbers (L1) of refractive index adjusting layer, characteristic improving layer, and AR film) of layer numbers of multilayer films formed on both surfaces of the glass substrates respectively is 3.8 (=L2/L1=38/10), which exceeds 2.5.

Example 11 (Reference Example)

On one of main surfaces of a fluorophosphate glass plate (product name: NF-50, manufactured by AGC TECHNO GLASS CO. LTD., size: 76 mm×76 mm, thickness: 0.3 mm), an IRCF film of a configuration the same as those of Examples 7 to 10 was formed by a deposition method using ion assist. Then, a warpage amount of an optical filter of Example 11 was measured by the following method. Because of a constitution of the above film-formed product (optical filter), a neighborhood of a glass plate center part being highest and four corners of the glass plate being lowest, the glass plate was disposed on a surface plate in a manner that a protruding surface faces up. Next, there were measured a highest position existing in the neighborhood of the center part of a surface on a protruding surface side and heights of a glass surface at four places of four corners of the glass plate, by using a height gage. Then, an average value of differences between the heights of four places and the height of the center part was defined as a warpage amount.

Next, from a measured value of the warpage amount of the optical filter of Example 11 and a formula of Stoney, warpage amounts of the optical filters of Examples 7 to 10 were calculated as follows.

In other words, from the formula of Stoney, on the following assumption, warpage amounts of Example 7 to Example 10 were calculated based on the measured value of Example 11.

the warpage amount is in inverse proportion to a square of a thickness of a substrate the warpage amount is in direct proportion to a square of a length of the substrate in a case where a film stress per unit volume is constant, since a physical film thickness of a film is in direct proportion to a stress, the physical film thickness and the warpage amount are directly proportional Note that a direction of warpage is a direction where a side on which the film is attached becomes protruded in each of the IRCF film and the AR film, and thus a warpage amount of the entire optical filter is a difference between warpage amounts of respective films. In the optical filters of Example 7 to Example 10, the warpage amount of the IRCF film is larger compared with that of the AR film, (warpage amount of IRCF film–warpage amount of AR film) becomes the warpage amount of the entire optical filter, and a warpage direction is the direction where an IRCF film side becomes protruded. Note that the above-described warpage amount is described on the assumption of warpage in the direction where the side on which the film is attached becomes protruded. In a dense film formed by deposition using ion assist or sputtering, the film stress is a compressive stress, and thus normally the optical filter is warped in a direction where a side on which a film is attached becomes protruded.

Table 6 shows calculation results of the warpage amounts of the optical filters of Examples 7 to 10 together with a measured result of the warpage amount of the optical filter of Example 11. Table 6 also shows the warpage amounts by the multilayer films (the refractive index adjusting layer, the characteristic improving layer, and the AR film) of the first surfaces and the warpage amounts by the IRCF films of the second surfaces.

Note that the $Al_2O_3$—$ZrO_2$ mixture film and the $MgF_2$ film which constitute the refractive index adjusting layer was formed by a deposition method not using ion assist. Further, the resin film being the characteristic improving layer was made of a polyester resin (refractive index: 1.63) and was formed by a spin coating method. Further, the antireflection film in which six layers in total of the $TiO_2$ films and the $SiO_2$ films were alternately stacked was formed by a deposition method using ion assist.

TABLE 7

| Layer number | Film material | Physical film thickness [nm] | Kind of layer |
|---|---|---|---|
| 1 | $Al_2O_3$ + $ZrO_2$ | 28.23 | Refractive index adjusting layer |
| 2 | $MgF_2$ | 13.12 | |
| 3 | $Al_2O_3$ + $ZrO_2$ | 28.22 | |
| 4 | Resin | 3048.38 | Characteristic improving layer |
| 5 | $TiO_2$ | 13.79 | AR film |
| 6 | $SiO_2$ | 27.90 | |

TABLE 6

| | Example 7 | | Example 8 | | Example 9 | | Example 10 | | Example 11 | |
|---|---|---|---|---|---|---|---|---|---|---|
| Plate thickness of substrate [mm] | 0.22 | | 0.22 | | 0.22 | | 0.22 | | 0.3 | |
| | Physical film thickness [μm] | Warpage amount [mm] | Physical film thickness [μm] | Warpage amount [mm] | Physical film thickness [μm] | Warpage amount [mm] | Physical film thickness [μm] | Warpage amount [mm] | Physical film thickness [μm] | Warpage amount [mm] |
| IRCF film only | 4.80 | 1.395 | 4.80 | 1.395 | 4.80 | 1.395 | 4.80 | 1.395 | 4.80 | 0.750 |
| Refractive index adjusting layer + characteristic improving layer + AR film | 2.08 | 0.605 | 1.03 | 0.298 | 3.31 | 0.960 | 0.23 | 0.067 | 0.00 | 0.000 |
| Entire optical filter | — | 0.790 | — | 1.097 | — | 0.434 | — | 1.328 | — | 0.750 |

The following is found from Table 6. From comparison between the warpage amounts of Examples 7 to 9 and the warpage amount of the optical filter of Example 10, it is found that providing the refractive index improving layer and the characteristic improving layer decreases the warpage amount of the entire optical filter. Further, from comparison among the warpage amounts of the optical filters of Example 7 to 9, it is found that the larger the film thickness of the characteristic improving layer is, the smaller the warpage amount is.

Example 12

As a glass substrate, one obtained by precision-polishing main surfaces of a fluorophosphate glass plate (product name: NF-50, manufactured by AGC TECHNO GLASS CO., LTD., size: 50 mm×50 mm, thickness: 0.22 mm) was used. Then, on one of the main surfaces of the glass substrate, there were formed, in sequence from a substrate side, a refractive index adjusting layer in which an $Al_2O_3$—$ZrO_2$ mixture film, a $MgF_2$ film, and an $Al_2O_3$—$ZrO_2$ mixture film are stacked in sequence, a resin film being a characteristic improving layer, and an AR film in which six layers in total of $TiO_2$ films and $SiO_2$ films are alternately stacked as an optical multilayer film, to thereby obtain an optical filter. Table 7 shows film materials constituting the respective films and physical film thicknesses in the optical filter of Example 12.

TABLE 7-continued

| Layer number | Film material | Physical film thickness [nm] | Kind of layer |
|---|---|---|---|
| 7 | $TiO_2$ | 56.90 | |
| 8 | $SiO_2$ | 6.87 | |
| 9 | $TiO_2$ | 38.52 | |
| 10 | $SiO_2$ | 87.35 | |
| Total of physical film thicknesses [nm] | | 3349.28 | |

Examples 13, 14

Film thicknesses of the resin films being characteristic improving layers were set to 1000 nm in Example 13 and 5000 nm in Example 14. Other than the above, materials (film materials) constituting respective layers and physical film thicknesses were set to the same as those in Example 12, to thereby fabricate optical filters.

Example 15

On one of main surfaces of a fluorophosphate glass plate (product name: NF-50, manufactured by AGC TECHNO GLASS CO., LTD., size: 50 mm×50 mm, thickness: 0.22 mm), there was formed a refractive index adjusting layer in which an $Al_2O_3$—$ZrO_2$ mixture film, a $MgF_2$ film, and an Al$_2$O$_3$ film are stacked in sequence, by a deposition method not using ion assist. Next, a polyester resin film being a characteristic improving layer was formed on the refractive index adjusting layer by a spin coating method, and thereon, an AR film in which six layers in total of TiO$_2$ films and SiO$_2$ films are alternately stacked was formed as an optical multilayer film, by a deposition method using ion assist, to thereby obtain an optical filter. Table 8 shows film materials constituting respective films and physical film thicknesses in the optical filter of Example 15.

TABLE 8

| Layer number | Film material | Physical film thickness [nm] | Kind of layer |
|---|---|---|---|
| 1 | Al$_2$O$_3$ + ZrO$_2$ | 20.23 | Refractive index adjusting layer |
| 2 | MgF$_2$ | 16.00 | |
| 3 | Al$_2$O$_3$ | 234.29 | |
| 4 | Resin | 3048 | Characteristic improving layer |
| 5 | TiO$_2$ | 14.42 | AR film |
| 6 | SiO$_2$ | 27.53 | |
| 7 | TiO$_2$ | 58.60 | |
| 8 | SiO$_2$ | 6.87 | |
| 9 | TiO$_2$ | 38.09 | |
| 10 | SiO$_2$ | 87.87 | |
| Total of physical film thicknesses [nm] | | 3551.9 | |

Examples 16, 17

Film thicknesses of the resin films being characteristic improving layers were set to 1000 nm in Example 16 and 5000 nm in Example 17. Other than the above, materials (film materials) constituting respective layers and physical film thicknesses were set to the same as those in Example 15, to thereby fabricate optical filters.

In the optical filters of Examples 12 to 17, Table 9 shows refractive indices (ns) of glass substrates, refractive indices (na) of refractive index adjusting layers, and refractive indices (ne) of the resin films being the characteristic improving layers. Note that all those refractive indices are refractive indices of light of 530 nm in wavelength. Further, the refractive index (na) of the refractive index adjusting layer is a refractive index as an equivalent film of the refractive index adjusting layer constituted by three films.

TABLE 9

| Example or Comparative example | Refractive index of substrate (ns) | Refractive index of refractive index adjusting layer (na) | Refractive index of characteristic improving layer (ne) |
|---|---|---|---|
| Example 12 | Example 1.573 | 1.602 | 1.63 |
| Example 13 | Example 1.573 | 1.602 | 1.63 |
| Example 14 | Example 1.573 | 1.602 | 1.63 |
| Example 15 | Example 1.573 | 1.602 | 1.63 |
| Example 16 | Example 1.573 | 1.602 | 1.63 |
| Example 17 | Example 1.573 | 1.602 | 1.63 |

From Table 9, it is found that a relation of ns<na<ne is established in the optical filters of Examples 12 to 17.

Next, spectral characteristics (spectral reflectances) at wavelengths 350 to 750 nm of the optical filters of Examples 12 to 17 were measured. Measured results are illustrated in FIG. 5 and FIG. 6.

Figure 5:
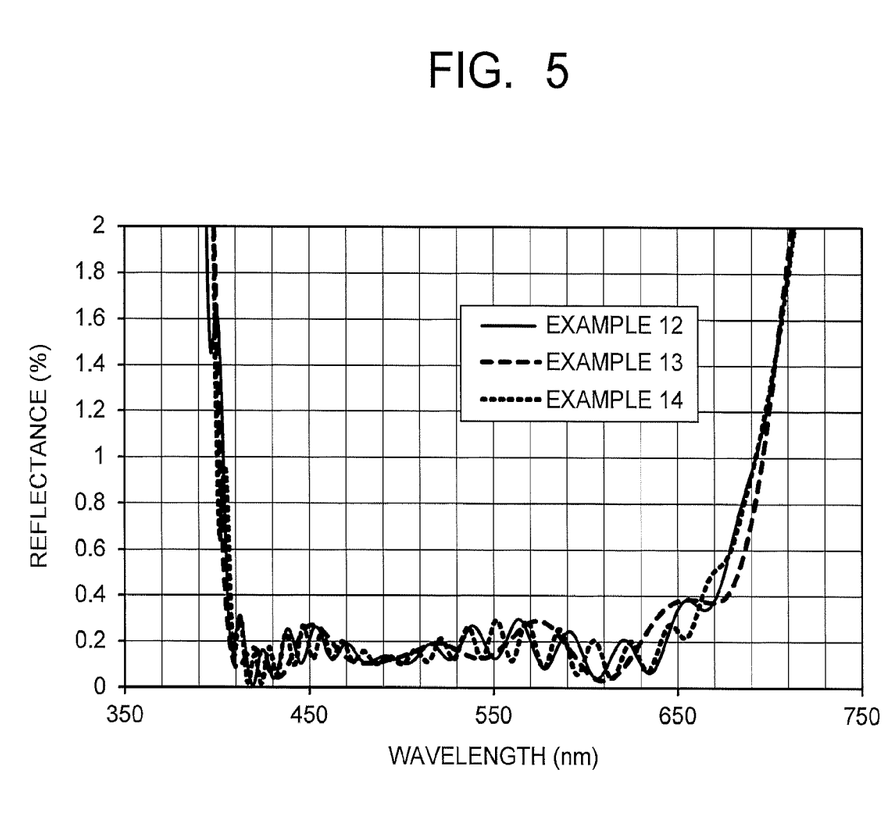
FIG. 5 is a graph illustrating spectral characteristics (spectral reflectances) of optical filters obtained in Example 12 to Example 14.
Figure 6:
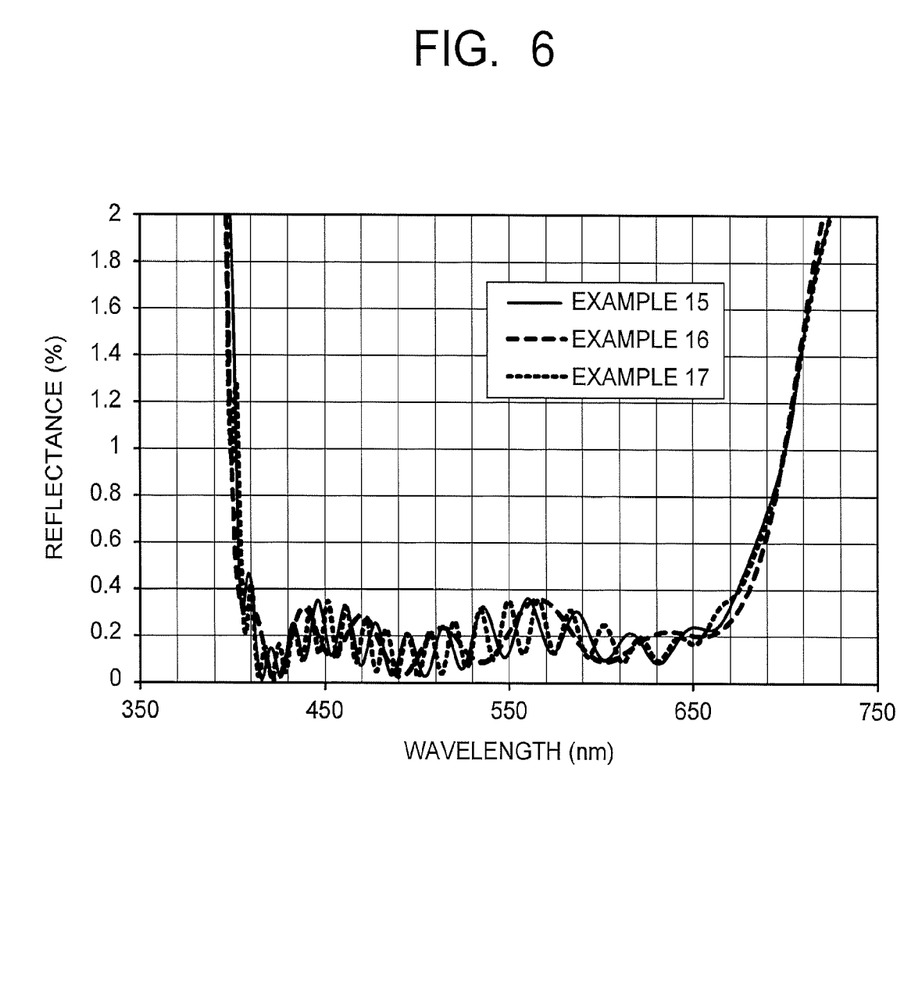
FIG. 6 is a graph illustrating spectral characteristics (spectral reflectances) of optical filters obtained in Example 15 to Example 17.

The following is found from graphs of FIG. 5 and FIG. 6. From comparison between the spectral characteristics of the optical filters of Examples 12 to 17 and the spectral characteristic of the optical filters of Example 1 to 3, it is found that even if the characteristic improving layer is the resin film, a negative effect on the spectral characteristic by providing the refractive index adjusting layer and the characteristic improving layer is hardly seen. Besides, from comparison among the spectral characteristics of the optical filters of Example 12 to 14 and comparison among the spectral characteristics of the optical filters of Examples 15 to 17, it is found that if the physical film thickness of the characteristic improving layer changes, the spectral characteristic hardly changes.

An optical filter of the present invention, in which an internal stress of an optical multilayer film is alleviated, has small distortion (warpage) of a substrate shape and a good optical characteristic. Therefore, the optical filter of the present invention is suitable as a near-infrared cut filter.

What is claimed is:

1. An optical filter comprising:
    a substrate;
    a refractive index adjusting layer formed on a first surface of the substrate;
    a characteristic improving layer having a stress adjustment function formed on the refractive index adjusting layer; and
    an optical multilayer film formed on the characteristic improving layer; wherein
    the refractive index adjusting layer is constituted by one to three layers; the characteristic improving layer is a single-layer film having a physical film thickness of 600 nm or more; and
    when a refractive index of the substrate is indicated as ns, a refractive index of the refractive index adjusting layer is indicated as na, where na is a refractive index of an equivalent film if the refractive index adjusting layer is multilayered, and a refractive index of the characteristic improving layer is indicated as ne,
    in a case of ns>ne, a relation of ns>na>ne is established, and
    in a case of ns<ne, a relation of ns<na<ne is established.

2. The optical filter according to claim 1, wherein the characteristic improving layer is a resin film.

3. The optical filter according to claim 1, wherein the characteristic improving layer is an inorganic film.

4. The optical filter according to claim 3, wherein the characteristic improving layer comprises at least one of silicon dioxide (SiO$_2$) and aluminum oxide (Al$_2$O$_3$).

5. The optical filter according to claim 1, wherein the substrate comprises a glass or a resin.

6. The optical filter according to claim 5, wherein the substrate comprises a fluorophosphate glass or a phosphate glass.

7. The optical filter according to claim 1, wherein the substrate has a thickness of 0.22 mm or less.

8. The optical filter according to claim 1, further comprising a near-infrared absorbing layer formed between the characteristic improving layer and the optical multilayer film, wherein the near-infrared absorbing layer comprises a transparent resin and an absorbent absorbing a near-infrared ray.

9. The optical filter according to claim 1, wherein the optical multilayer film on the characteristic improving layer has an anti-reflection function.

10. The optical filter according to claim 1, further comprising a second optical multilayer film formed on a second surface of the substrate opposite to the first surface of the substrate on which the refractive index adjusting layer and the characteristic improving layer are present.

11. The optical filter according to claim 10, wherein the second optical multilayer film has a total film thickness of 2 µm or more and a total layer number of 20 or more.

12. The optical filter according to claim 10, wherein a ratio between a layer number L2 of the second optical multilayer film and a total layer number on a first surface L1 being total of layer numbers of the first optical multilayer film, the refractive index adjusting layer, and the characteristic improving layer which are formed on the first surface of the substrate satisfies the following formula:

$$2.5 < L2/L1 \leq 50.$$

13. The optical filter according to claim 10, wherein the second optical multilayer film has an infrared cutting function.

14. A near-infrared cut filter comprising the optical filter according to claim 1.

* * * * *